United States Patent
Nakai et al.

(10) Patent No.: US 11,329,268 B2
(45) Date of Patent: May 10, 2022

(54) LITHIUM PRIMARY BATTERY

(71) Applicant: PANASONIC INTELLECTUAL PROPERTY MANAGEMENT CO., LTD., Osaka (JP)

(72) Inventors: Miyuki Nakai, Osaka (JP); Yasuyuki Kusumoto, Hyogo (JP); Yusuke Kawahara, Osaka (JP); Futoshi Tanigawa, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

(21) Appl. No.: 16/497,580

(22) PCT Filed: Feb. 14, 2018

(86) PCT No.: PCT/JP2018/004966
§ 371 (c)(1),
(2) Date: Sep. 25, 2019

(87) PCT Pub. No.: WO2018/179935
PCT Pub. Date: Oct. 4, 2018

(65) Prior Publication Data
US 2021/0104725 A1    Apr. 8, 2021

(30) Foreign Application Priority Data

Mar. 30, 2017  (JP) .............. JP2017-066968

(51) Int. Cl.
| | |
|---|---|
| *H01M 4/06* | (2006.01) |
| *H01M 4/50* | (2010.01) |
| *H01M 4/62* | (2006.01) |
| *H01M 6/16* | (2006.01) |
| *H01M 4/02* | (2006.01) |

(52) U.S. Cl.
CPC ............. *H01M 4/06* (2013.01); *H01M 4/502* (2013.01); *H01M 4/62* (2013.01); *H01M 6/168* (2013.01); *H01M 2004/028* (2013.01); *H01M 2300/0025* (2013.01)

(58) Field of Classification Search
None
See application file for complete search history.

(56) References Cited

U.S. PATENT DOCUMENTS 3,436,323 A * 4/1969 Kazuo .................. C25B 1/21
                                                                205/542
5,744,266 A    4/1998 Nunome et al.

FOREIGN PATENT DOCUMENTS

| JP | 57-003368 A | 1/1982 |
|---|---|---|
| JP | 62-168344 A | 7/1987 |
| JP | 9-245785 A | 9/1997 |
| JP | 11-339794 A | 12/1999 |
| JP | 2006-12533 A | 1/2006 |
| JP | 2006-236889 A | 9/2006 |

OTHER PUBLICATIONS

International Search Report dated May 1, 2018, issued in counterpart Application No. PCT/JP2018/004966 (2 pages).

* cited by examiner

*Primary Examiner* — Laura Weiner
(74) *Attorney, Agent, or Firm* — WHDA, LLP (57) ABSTRACT

A positive electrode, a negative electrode containing lithium, and a nonaqueous electrolyte having lithium ion conductivity are installed. The nonaqueous electrolyte contains a nonaqueous solvent and a solute. The positive electrode contains a positive electrode active material containing at least manganese dioxide, a conductive agent, and a binding agent and further contains an oxide and sulfate of a rare-earth element.

7 Claims, 4 Drawing Sheets

LITHIUM PRIMARY BATTERY

TECHNICAL FIELD

The present invention relates to a lithium primary battery and particularly relates to a positive electrode thereof.

BACKGROUND ART

In recent years, applications of electronic devices powered by lithium primary batteries have been expanding. In association with this, long-term storage durability tends to be required. In particular, a lithium primary battery including a positive electrode containing manganese oxide or graphite fluoride and a negative electrode containing metallic lithium has a wide operating temperature range and has been in practical use.

For batteries containing metallic lithium, in order to suppress the increase in resistance of the batteries during long-term storage, it has been proposed that rare-earth oxides such as yttrium oxide and lanthanum oxide are used in a positive electrode (Patent Literature 1); boron oxide, which is a rare-earth oxide, is mixed (Patent Literature 2); and a nonaqueous electrolyte solution is allowed to contain phthalimide (Patent Literature 3).

CITATION LIST

Patent Literature

PTL 1: Japanese Published Unexamined Patent Application No. 57-3368
PTL 2: Japanese Published Unexamined Patent Application No. 11-339794
PTL 3: Japanese Published Unexamined Patent Application No. 2006-236889

SUMMARY OF INVENTION

In lithium primary batteries, the permeability of a nonaqueous electrolyte through a mix (hereinafter referred to as a positive electrode mix) containing a positive electrode active material, a conductive agent, and a binding agent is likely to vary after battery assembly and therefore the open-circuit voltage (OCV) tends to be unstable. Thus, in order to resolve this, the internal state of a battery has hitherto needed to be stabilized by pre-discharge in the course of manufacturing the battery for the purpose of stabilizing the OCV.

A method in which phthalimide is added to the nonaqueous electrolyte solution or yttrium oxide or lanthanum oxide is mixed with the positive electrode active material as described above has been proposed as a method for suppressing the increase in resistance during long-term storage. As is the case with usual lithium primary batteries, the permeability of a nonaqueous electrolyte is likely to vary and therefore the internal state of a battery has needed to be stabilized by pre-discharge in the course of manufacturing the battery. However, although the internal state of the battery is stabilized by pre-discharge, there is a problem in that the capacity of the battery decreases.

In view of the above problem, an aspect of the present disclosure relates to a lithium primary battery including a positive electrode, a negative electrode containing lithium, and a nonaqueous electrolyte having lithium ion conductivity. The nonaqueous electrolyte contains a nonaqueous solvent and a solute. The positive electrode contains a positive electrode active material containing at least manganese dioxide, a conductive agent, and a binding agent and further contains an oxide and sulfate of a rare-earth element.

According to the present disclosure, after the assembly of a lithium primary battery, the variation in OCV of the battery in a state before pre-discharge is performed (before pre-discharge) is suppressed. Thus, it is unnecessary to perform pre-discharge and the battery capacity can be increased.

DESCRIPTION OF EMBODIMENTS

In view of the above, an aspect of the present invention relates to a lithium primary battery including a positive electrode, a negative electrode containing lithium, and a nonaqueous electrolyte having lithium ion conductivity. The nonaqueous electrolyte contains a nonaqueous solvent and a solute. The positive electrode contains a positive electrode active material containing at least manganese dioxide, a conductive agent, and a binding agent and further contains an oxide and sulfate of a rare-earth element.

When being present together with the positive electrode active material, the rare-earth element oxide and sulfate can enhance the permeability of the nonaqueous electrolyte through the positive electrode.

In usual, positive electrodes of lithium primary batteries form porous layers and the permeability of nonaqueous electrolytes are likely to vary. Thus, variations in OCV occur in the batteries before pre-discharge. However, allowing the positive electrodes to have the property of enhancing the permeability of the nonaqueous electrolytes averages the potentials of the positive electrodes, thereby suppressing the variation in OCV of the batteries. As a result, pre-discharge need not be performed and the battery capacity can be increased.

Herein, before pre-discharge refers to a state in which a time of ten hours to 24 hours has lapsed after the positive electrode and the negative electrode are brought into contact with the nonaqueous electrolyte and pre-discharge has yet not been performed.

The rare-earth element oxide and/or sulfate is preferably in contact with the manganese dioxide.

When being in contact with the manganese dioxide, the rare-earth element oxide and/or sulfate can enhance the permeability of the nonaqueous electrolyte through the manganese dioxide.

The rare-earth element is preferably at least one selected from the group consisting of yttrium, lanthanum, and ytterbium.

Oxides of these are yttrium oxide, lanthanum oxide, and ytterbium oxide. These materials have a Gibbs free energy of about −1,700 kJ/mol to −1,800 kJ/mol, the Gibbs free energy representing the stability of a substance.

Sulfates of these are yttrium sulfate, lanthanum sulfate, and ytterbium sulfate. These materials have a Gibbs free energy of about −2,200 kJ/mol, the Gibbs free energy representing the stability of a substance as a sulfate ion.

These oxides and sulfates have higher affinity to the nonaqueous electrolyte as compared to manganese dioxide and the co-presence thereof enhances the permeability of the nonaqueous electrolyte through the positive electrode. These materials are readily industrially available.

Examples of another rare-earth element include samarium, erbium, terbium, dysprosium, holmium, thulium, lutetium, neodymium, praseodymium, and scandium. These may be used alone or in combination.

The amount of the rare-earth element oxide and sulfate is preferably, for example, 0.1 parts by mass to five parts by mass per 100 parts by mass of the manganese dioxide. When the amount thereof is 0.1 parts by mass or more, the effect of substantially enhancing the permeability of the nonaqueous electrolyte through the positive electrode is obtained. When the amount thereof is five parts by mass or more, the amount of the positive electrode active material decreases and therefore the electrical capacity decreases. When the amount thereof is within this range, a state in which the rare-earth element oxide and sulfate are uniformly dispersed in a positive electrode mix in the vicinity of the positive electrode active material can be obtained without impairing the electrical capacity, thereby enhancing the permeability of the nonaqueous electrolyte through the positive electrode.

The amount of the rare-earth element sulfate, which is contained in the positive electrode, is preferably less than the amount of the rare-earth element oxide. This allows the permeability of the nonaqueous electrolyte to be better.

The average particle size of the rare-earth element oxide is preferably less than that of the positive electrode active material. The average particle size thereof is preferably, for example, 10 μm or less. The average specific surface area thereof is preferably 2 m$^2$/g or more. The particle size of the rare-earth element sulfate is preferably less than that of the positive electrode active material and is preferably less than the particle size of the rare-earth element oxide. The particle size thereof is preferably, for example, 5 μm or less. When the particle size thereof is within this range, a state in which the above-mentioned rare-earth element oxide and sulfate are uniformly dispersed in the positive electrode active material and the positive electrode mix can be obtained.

The manganese dioxide is preferably electrolytic manganese dioxide. Electrolytic manganese dioxide is manganese dioxide, deposited on the anode side in an electrolytic step, having high purity; is highly workable; and has features that the particle size, the pH, the surface condition of particles thereof, the amount of an impurity, and the like can be arbitrarily adjusted. Thus, obtaining manganese dioxide with high purity enables the reactivity with the rare-earth element oxide and sulfate to be controlled and also enables a configuration in which the rare-earth element oxide and sulfate are likely to be appropriately placed to be obtained.

In the case of using a sulfuric acid solution in the electrolytic step, anodically deposited manganese dioxide contains a sulfur component. The sulfur component is a sulfate, of which the amount can be appropriately adjusted in a washing step.

For the sulfate, in the case where the mixing of the positive electrode is due to a wet process using water, the positive electrode mix forms into aqueous acidic slurry because of the dissolution of the sulfate when the positive electrode active material, which contains electrolytic manganese dioxide, the rare-earth element oxide, the conductive agent, and the binding agent are mixed together. In this slurry, the rare-earth element sulfate can be usually produced from a portion of the rare-earth element oxide, which is insoluble and/or sparingly soluble in water, by dissolution, reaction, or the like in consideration of the Gibbs free energy. The rare-earth element sulfate can be deposited on the surface of the positive electrode active material during drying.

Furthermore, the deposited rare-earth element sulfate is allowed to be present together with the rare-earth element oxide in a hybridized state and can be deposited between, for example, an active material and the rare-earth element oxide.

In the above-mentioned wet process, when the electrolytic manganese dioxide and the rare-earth element oxide are mixed together, water is preferably added to the mixture such that the vicinity of the positive electrode has a pH of about 4.5 to 6.0. This allows a sulfate group contained in electrolytic manganese dioxide in the production thereof, that is, the sulfur component to be readily dissolved in water, thereby readily obtaining the sulfate from the rare-earth element oxide. This enables a process in which the sulfate is separately added in the mixing of the positive electrode to be omitted.

In the mixing of the positive electrode, the positive electrode active material, which contains manganese dioxide, the rare-earth element oxide, and the rare-earth element sulfate may be mixed together by a dry process using no water.

The amount of sulfur element is preferably 0.05 parts by mass to 2 parts by mass per 100 parts by mass of manganese dioxide. In this case, the partial dissolution of the rare-earth element oxide and the deposition of the rare-earth element sulfate are likely to uniformly occur in the wet process, the rare-earth element sulfate is dispersed, and the permeability can be further enhanced.

When manganese dioxide is electrolytic manganese dioxide, sulfur element contained in electrolytic manganese dioxide is preferably 0.05 parts by mass to 1.99 parts by mass.

The nonaqueous electrolyte preferably contains phthalimide. In order to suppress the increase in resistance during long-term storage for the purpose of enhancing the battery durability, phthalimide is preferable. Adding phthalimide to the nonaqueous electrolyte usually reduces the permeability of the nonaqueous electrolyte through a positive electrode porous layer. However, the permeability of the nonaqueous electrolyte is synergistically enhanced in such a manner that the positive electrode porous layer is formed so as to contain the rare-earth element oxide and sulfate. The reaction of phthalimide with the positive electrode varies depending on the arrangement and configuration of the rare-earth element oxide and sulfate to synergistically enhance the permeability of the nonaqueous electrolyte.

At least one portion of a surface of the negative electrode that faces the positive electrode preferably has a powdery or fibrous carbon material attached thereto. This configuration of the negative electrode allows the distribution of the nonaqueous electrolyte in the battery to be appropriately dispersed between the positive electrode and the negative electrode and allows the permeability of the nonaqueous electrolyte through the positive electrode to be uniform, resulting in the enhancement of the permeability.

Figure 1:
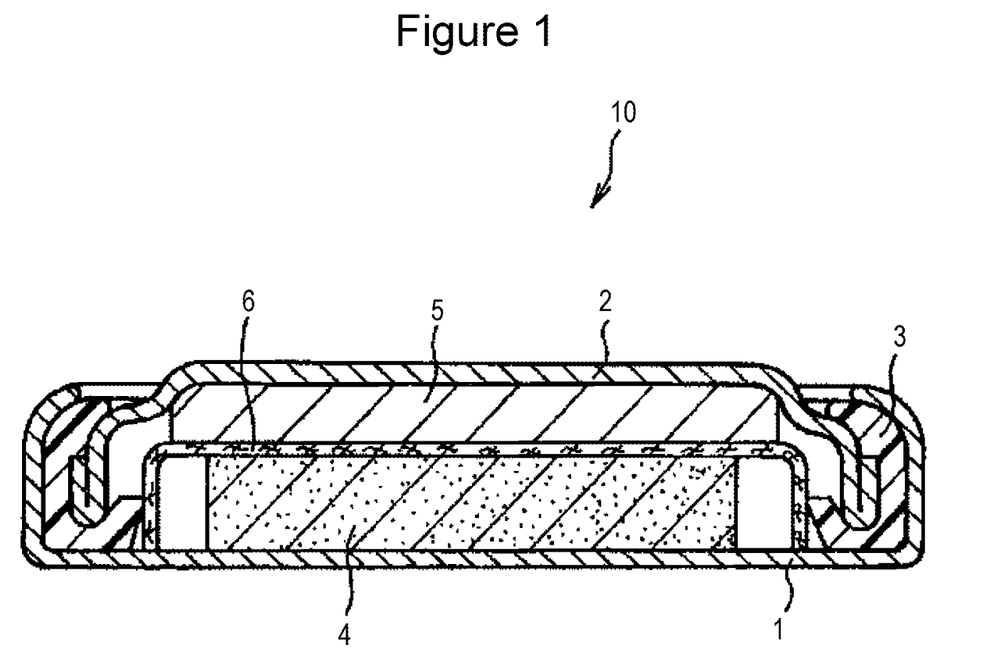
FIG. 1 is a sectional view of an example of a coin-shaped lithium primary battery according to an embodiment of the present invention.

An embodiment of the present invention is further described below in detail. FIG. 1 shows an example of a coin- or button-shaped lithium primary battery according to this embodiment in sectional view. Incidentally, the shape of the lithium primary battery is not limited to this and, for example, various shapes such as a cylindrical shape, a prismatic shape, a sheet shape, a flat shape, and a stacked shape can be appropriately selected.

A lithium primary battery 10 includes a positive electrode 4, a negative electrode 5, a separator 6 interposed between the positive electrode 4 and the negative electrode 5, and a nonaqueous electrolyte, which is not shown. The positive electrode 4 is housed in a battery case 1 doubling as a positive electrode current collector and a positive electrode terminal. The negative electrode 5 is attached to an inner surface of a sealing plate 2 doubling as a negative electrode terminal. A surface of the negative electrode 5 that faces the positive electrode 4 may have a carbon material (not shown) attached thereto. The battery case 1 has an opening covered by the sealing plate 2. A peripheral portion of the sealing plate 2 is provided with a gasket 3. The inside of the battery is hermetically sealed in such a manner that an opening end portion of the battery case 1 is bent inward and the gasket 3 is clamped between the battery case 1 and the sealing plate 2.

(Positive Electrode)

The positive electrode 4 can be obtained in such a manner that, for example, a mixture (positive electrode mix) containing a positive electrode active material, a conductive agent, and a binding agent is formed into a disk shape. Alternatively, the positive electrode 4 can be obtained in such a manner that the positive electrode mix is held with a positive electrode current collector. The positive electrode current collector may be made of, for example, stainless steel, aluminium, titanium, or the like.

The positive electrode active material contains manganese dioxide. The positive electrode active material may contain manganese dioxide only or a mixture containing manganese dioxide, graphite fluoride, and the like. Batteries containing manganese dioxide generate relatively high voltage and have excellent pulsed discharge characteristics.

The oxidation number of manganese in manganese dioxide is typically tetravalent and is not limited to tetravalent and slight fluctuations therein are allowable. Examples of usable manganese dioxide include MnO, $Mn_3O_4$, $Mn_2O_3$, $MnO_2$, and $MnO_3$. In general, manganese dioxide is used as a main component. Manganese dioxide may be in a mixed crystal state including a plurality of crystal states.

The specific surface area of manganese dioxide is preferably, for example, 10 $m^2$/g to 30 $m^2$/g. Setting the specific surface area of manganese oxide to the above range facilitates ensuring a discharge reaction field sufficiently and increases the effect of suppressing a degradation reaction of the nonaqueous electrolyte. Thus, this is advantageous in ensuring the battery capacity and in suppressing the reduction of the battery capacity due to side reactions. The specific surface area of manganese dioxide is preferably 10 $m^2$/g to 30 $m^2$/g and more preferably 15 $m^2$/g to 25 $m^2$/g.

The average particle size of manganese dioxide is preferably, for example, 10 μm to 100 μm. Manganese dioxide used is preferably industrially produced electrolytic manganese dioxide.

(Conductive Agent)

The conductive agent used may be, for example, natural graphite, synthetic graphite, carbon black, carbon fibers, or the like. Examples of carbon black include acetylene black, Ketjenblack, channel black, furnace black, lamp black, and thermal black. These may be used alone or in combination. The amount of the conductive agent contained in the positive electrode mix is, for example, 2 parts by mass to 30 parts by mass per 100 parts by mass of the positive electrode active material.

(Binding Agent)

The binding agent used may be, for example, an olefin resin such as polyethylene or polypropylene; a fluorocarbon resin such as polytetrafluoroethylene (PTFE), polyvinylidene fluoride, a tetrafluoroethylene-hexafluoropropylene copolymer, or a vinylidene fluoride-hexafluoropropylene copolymer; styrene-butadiene rubber; fluorocarbon rubber; or poly(meth)acrylic acid. These may be used alone or in combination. The amount of the binding agent contained in the positive electrode mix is, for example, one part by mass to 15 parts by mass per 100 parts by mass of the positive electrode active material.

(Negative Electrode)

The negative electrode 5 contains at least one of metallic lithium and a lithium alloy. The lithium alloy is an alloy containing lithium and an element M other than lithium. The element M preferably includes at least one selected from the group consisting of Mg, Al, Ca, Ti, V, Cr, Mn, Fe, Co, Ni, Cu, and Zn. The content of the element M in the lithium alloy is preferably 20% or less on an atomic basis. The negative electrode is obtained in such a manner that, for example, a sheet of metallic lithium or the lithium alloy is punched into a disk shape. The negative electrode may be used in such a manner that the negative electrode is attached to a negative electrode current collector. The negative electrode current collector may be made of, for example, copper, nickel, stainless steel, or the like.

A powdery or fibrous material may be attached to at least one portion of a surface of the negative electrode that faces the positive electrode.

The amount of the material attached to the negative electrode surface is preferably 0.02 mg to 10 mg per 1 $cm^2$ of the surface of the negative electrode that faces the positive electrode. This enhances the effect of increasing the specific surface area and the effect of suppressing the formation of a resistance component on surfaces of the negative electrode. Furthermore, the distribution of the nonaqueous electrolyte in the battery is dispersed between the positive electrode and the negative electrode and therefore the permeability of a liquid through the positive electrode becomes uniform and stabilizes.

(Nonaqueous Electrolyte)

The nonaqueous electrolyte contains a nonaqueous solvent, a solute, and an additive. The solute may contain lithium salts such as $LiCF_3SO_3$, $LiClO_4$, $LiPF_6$, $LiR^1SO_3$ [$R^1$ is a fluorinated alkyl group containing one to four carbon atoms], and $LiN(SO_2R^2)(SO_2R^3)$ [$R^2$ and $R^3$ are independently a fluorinated alkyl group containing one to four carbon atoms]. These may be used alone or in combination. The total concentration of the solute in the nonaqueous electrolyte is preferably 0.2 mol/L to 2.0 mol/L, more preferably 0.3 mol/L to 1.5 mol/L, and particularly preferably 0.4 mol/L to 1.2 mol/L.

In a lithium salt (sulfonate) represented by $LiR^1SO_3$, a fluorinated alkyl group, represented by $R^1$, containing one to four carbon atoms is preferably a perfluoroalkyl group containing one to four carbon atoms and is particularly a perfluoromethyl, a perfluoroethyl, a perfluoropropyl, a perfluorobutyl, or the like. In a lithium salt (imide salt) represented by $LiN(SO_2R^2)(SO_2R^3)$, fluorinated alkyl groups, represented by $R^2$ and $R^3$, containing one to four carbon atoms are preferably perfluoroalkyl groups containing one to four carbon atoms and are particularly a perfluoromethyl, a perfluoroethyl, a perfluoropropyl, a perfluorobutyl, or the like. These organic salts containing carbon are stable at a battery operating voltage, are unlikely to cause side reactions, and therefore are suitable as solutes.

The nonaqueous solvent may contain linear carbonates such as dimethyl carbonate (DMC), diethyl carbonate (DEC), and ethyl methyl carbonate (EMC); cyclic carbonates such as ethylene carbonate (EC), propylene carbonate (PC), and butylene carbonate (BC); linear ethers such as 1,2-dimethoxyethane (DME), 1,2-diethoxyethane (DEE), and ethoxymethoxyethane (EME); cyclic ethers such as tetrahydrofuran, 2-methyltetrahydrofuran, 1,3-dioxolane, and 4-methyl-1,3-dioxolane; and cyclic carboxylates such as γ-butyrolactone. These may be used alone or in combination.

The nonaqueous solvent preferably contains a cyclic carbonate with a high boiling point and a linear ether with low viscosity at low temperature. The cyclic carbonate preferably includes at least one selected from the group consisting of propylene carbonate (PC) and ethylene carbonate (EC) and is particularly preferably PC. The linear ether preferably includes dimethoxyethane (DME). In this case, the nonaqueous electrolyte preferably contains 40% by mass to 98% by mass of DME, PC, and/or BC in total; more preferably 70% by mass to 97% by mass; and particularly preferably 70% by mass to 90% by mass. The nonaqueous solvent is electrochemically stable in a wide temperature range from low temperature to high temperature and is excellent in having high electrical conductivity. The mixing ratio of PC and/or BC to DME is preferably 5/95 to 100/0 in terms of the volume ratio of (PC and/or BC)/DME and more preferably 10/90 to 80/20.

(Separator)

A microporous membrane (microporous film) containing resin, a nonwoven fabric, or the like can be exemplified as the separator. Examples of resin making up the separator include polyolefin resins such as polyethylene, polypropylene, and ethylene-propylene copolymers. The microporous film may contain inorganic particles as required. The thickness of the separator is, for example, 5 μm to 600 μm.

Figure 2:
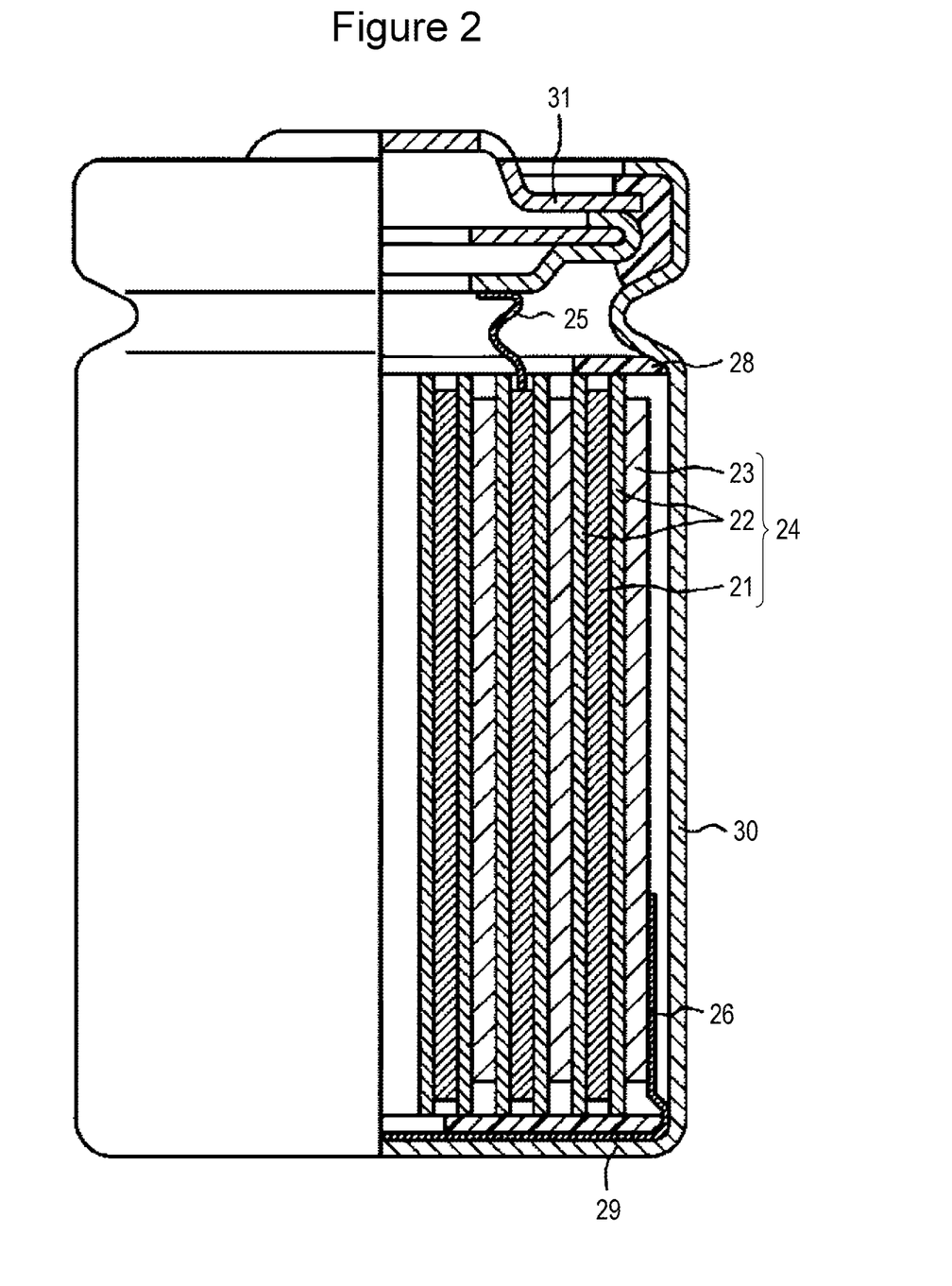
FIG. 2 is a sectional view of an example of a cylindrical or wound lithium primary battery according to an embodiment of the present invention.

An example of the preferred configuration of a cylindrical lithium primary battery is described below as another embodiment of the present invention. FIG. 2 shows an example of the morphology of a cylindrical or wound lithium primary battery, such as a lithium primary battery having a wound plate configuration, in a wound plate configuration in which a plurality of positive and negative electrodes face each other.

The lithium primary battery includes an electrode group 24 formed by winding a positive electrode 21 and a negative electrode 22 with a separator 23 therebetween. The electrode group 24 is housed in a battery case 30 together with a nonaqueous electrolyte solution (not shown, held with, for example, the separator 23). The battery case 30 has an opening sealed with a sealing plate (positive electrode terminal) 31. The positive electrode 21 includes a positive electrode current collector 27 and is connected to the sealing plate 31 with a positive electrode lead 25 therebetween. The negative electrode 22 is connected to a bottom surface of the battery case 30 with a negative electrode lead 26 therebetween. The electrode group 24 is overlaid with an upper insulating plate 28 and overlies a lower insulating plate 29. In a battery having an electrode configuration composed of such a positive electrode and negative electrode, in a configuration in which the positive electrode 21 contains an oxide and sulfate of a rare-earth element, an electrode configuration in which a current collector is exposed on a single surface is preferable.

Figure 3:
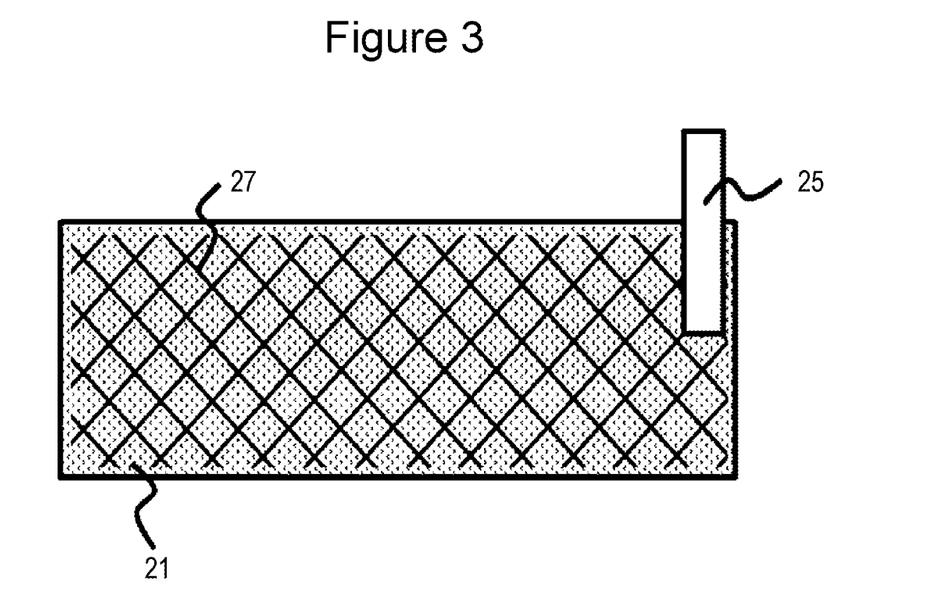
FIG. 3 is an illustration showing an example of a positive electrode of a wound electrode plate of a cylindrical or wound lithium primary battery according to an embodiment of the present invention.

Herein, FIG. 3 is an illustration showing an example of a positive electrode of a cylindrical or wound electrode plate of a lithium primary battery according to an embodiment of the present invention. In particular, FIG. 3 is a plan view of a wound positive electrode 21 in a developed state. As shown in FIG. 3, a positive electrode mix is held with a positive electrode current collector 27, made of metal, lattice-shaped in plan view.

Figure 4:
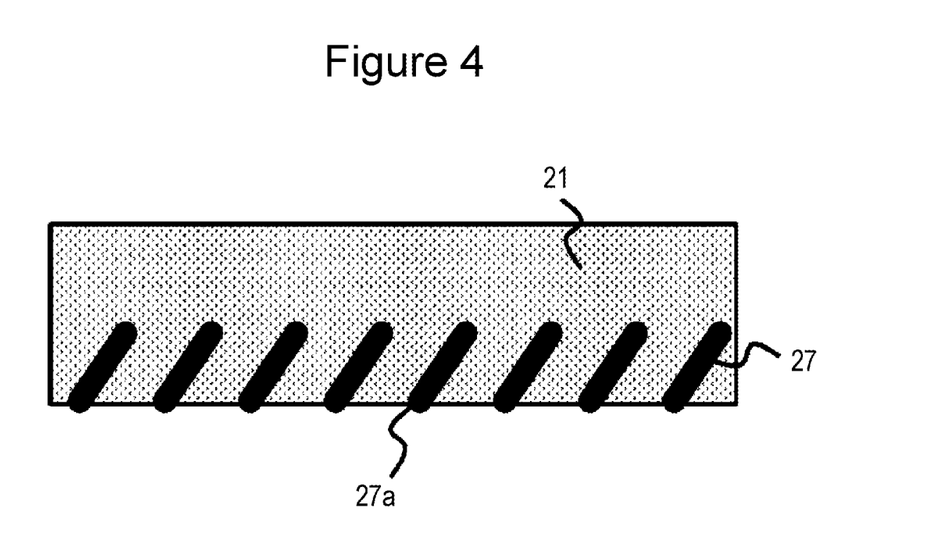
FIG. 4 is a sectional view of an example of a positive electrode of a wound electrode plate of a cylindrical or wound lithium primary battery according to an embodiment of the present invention.

FIG. 4 is a schematic sectional view of an example of a positive electrode of a cylindrical or wound electrode plate of a lithium primary battery according to an embodiment of the present invention in a developed state and shows that a portion of a positive electrode current collector 27 has a positive electrode current collector exposed portion 27a exposed from a single surface of a positive electrode 21.

Figure 5:
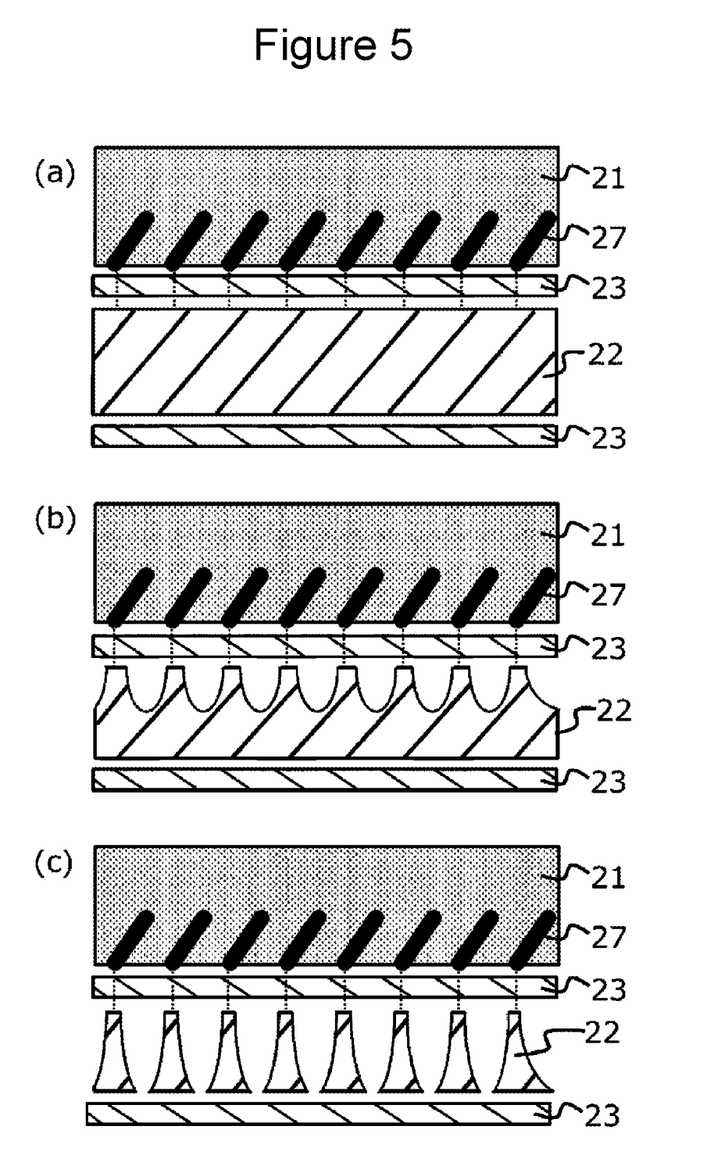
FIG. 5 is a sectional view schematically showing the distribution of the state of discharge in a negative electrode of a wound electrode plate of a cylindrical or wound lithium primary battery according to an embodiment of the present invention.

FIG. 5 is a sectional view schematically showing an example of the distribution of the state of discharge (the release of a negative electrode material) in a negative electrode in a state in which a cylindrical or wound electrode plate of a lithium primary battery according to an embodiment of the present invention is developed.

FIG. 5(a) shows the initial state of discharge, FIG. 5(b) shows the intermediate state of discharge, and FIG. 5(c) shows the final state of discharge. Dotted lines in FIGS. 5(a) to 5(c) show a positive electrode current collector exposed portion 27a and facing portions of a negative electrode 22.

Since 27a is placed such that the positive electrode current collector is exposed from a single surface of the positive electrode 21 as shown in FIG. 4, the reaction of the negative electrode 22, which faces the positive electrode current collector exposed portion 27a, is inhibited during discharge as shown in FIG. 5. This intentionally creates the distribution of a discharge reaction in the negative electrode 22 like the intermediate state of discharge shown in FIG. 5(b) and ensures current collection properties of a portion of the negative electrode 22 that faces the positive electrode current collector exposed portion 27a in the final state of discharge shown in FIG. 5(c), thereby enabling a reduction in capacity due to the reduction in current collection properties of the negative electrode to be suppressed.

On the other hand, since the positive electrode current collector exposed portion 27a is placed, the area of the positive electrode that can absorb a liquid is limited, thereby reducing the permeability of the nonaqueous electrolyte through the positive electrode 21. However, the positive electrode is formed so as to contain an oxide and sulfate of a rare-earth element, whereby the permeability of the nonaqueous electrolyte is enhanced, the variation in OCV of the battery before pre-discharge is suppressed, pre-discharge can be omitted, and current collection properties of the negative electrode in the final state of discharge are ensured, thereby enabling the reduction in capacity of the battery to be suppressed.

The present invention is described below in detail with reference to examples and comparative examples. The present invention is not limited to the examples below.

EXAMPLE 1

(1) Preparation of Positive Electrode

A positive electrode active material used was electrolytic manganese dioxide containing 1.1 parts by mass of a sulfuric acid component per 100 parts by mass. The electrolytic manganese dioxide was calcined at 400° C. for eight hours so as to contain substantially no water.

Five parts by mass of Ketjenblack serving as a conductive agent, five parts by mass of polytetrafluoroethylene (PTFE) serving as a binding agent, 2 parts by mass of lanthanum oxide ($La_2O_3$), and 20 parts by mass of distilled water were added to 100 parts by mass of the electrolytic manganese dioxide, followed by sufficient mixing (wet process). Lanthanum oxide used had a particle size of 0.5 μm. In this operation, a positive electrode mix had a pH of 5. Therefore, in the positive electrode mix, lanthanum oxide was partially dissolved to form a sulfate. Thereafter, drying was performed at 80° C., whereby a positive electrode mix was prepared in such a state that lanthanum sulfate was deposited on the surface of the electrolytic manganese dioxide and lanthanum oxide and lanthanum sulfate were hybridized.

A positive electrode was prepared in such a manner that the positive electrode mix was formed into a disk having a diameter of 15 mm and a thickness of 3.0 mm, followed by drying at 200° C.

Herein, a surface of the above-mentioned positive electrode was analyzed for the distribution of sulfur and lanthanum by energy dispersive X-ray spectroscopy. For energy dispersive X-ray spectroscopy, JED-2300 manufactured by JEOL Ltd. was used. Sulfur was more strongly detected in a portion in which lanthanum was detected than in a peripheral portion thereof, whereby it was confirmed that a portion of lanthanum oxide was present in the form of a sulfate because of the wet process.

After the disk was formed, the amount of a sulfur component in the mix was analyzed (ICP analysis) and was found to be 0.4 parts by mass per 100 parts by mass of manganese dioxide.

The amount of a lanthanum component in an extraction liquid extracted from the above-mentioned undried positive electrode mix was analyzed (ICP analysis) and was valued in terms of a sulfate of lanthanum, resulting in that The amount of lanthanum sulfate was 0.04 parts by mass per 100 parts by mass of manganese dioxide. Thus, the amount of lanthanum oxide was 1.96 parts by mass per 100 parts by mass of manganese dioxide.

(2) Preparation of Negative Electrode

A 1.0 mm thick sheet made of metallic lithium was punched into a disk with a diameter of 16 mm and this was formed into a negative electrode.

(3) Preparation of Nonaqueous Electrolyte

A nonaqueous solvent was obtained by mixing propylene carbonate (PC), ethylene carbonate (EC), and 1,2-dimethoxyethane (DME) at a volume ratio of 1:2:1. A nonaqueous electrolyte containing 0.5 mol/L of $LiCF_3SO_3$ as a solute was prepared using the nonaqueous solvent.

(4) Preparation of Coin-shaped Lithium Primary Battery

A bottomed battery case (positive electrode terminal), made of stainless steel, having an opening was prepared, followed by placing the positive electrode and a separator inside the battery case in that order. The separator used was a nonwoven fabric, made of polypropylene (PP), having a thickness of 0.45 mm. On the other hand, a sealing plate (negative electrode terminal), made of stainless steel, having a peripheral portion provided with a gasket made of PPS was prepared, followed by attaching the negative electrode to the inner surface thereof. Furthermore, a disk-shape composite of a carbon material and a holding material was attached to a surface of the negative electrode (a surface facing the positive electrode). After the nonaqueous electrolyte was poured into the battery case such that the positive electrode and the separator were in contact with the nonaqueous electrolyte, the opening of the battery case was covered with the sealing plate and an opening end portion of the battery case was swaged to the peripheral portion of the sealing plate. After being swaged, the battery case was left stationary at room temperature for 12 hours before pre-discharge.

Thereafter, pre-discharge was performed at a constant current of 4 mA for two hours. Furthermore, the battery case was left stationary at 45° C. for three days, whereby a battery was completed, resulting in obtaining a coin-shaped lithium primary battery (Battery A1) as shown in FIG. 1. This state was defined as after pre-discharge.

EXAMPLE 2

A coin-shaped lithium primary battery (Battery A2) was prepared in substantially the same manner as that used to prepare Battery A1 except that lanthanum oxide was changed to yttrium oxide ($Y_2O_3$) in the preparation of a positive electrode.

The amount of Yttrium oxide in the positive electrode mix and yttrium sulfate therein were 1.87 parts by mass and 0.13 parts by mass, respectively, per 100 parts by mass of manganese dioxide.

EXAMPLE 3

A coin-shaped lithium primary battery (Battery A3) was prepared in substantially the same manner as that used to prepare Battery A1 except that lanthanum oxide was changed to ytterbium oxide ($Yb_2O_3$) in the preparation of a positive electrode.

The amount of Ytterbium oxide in the positive electrode mix and ytterbium sulfate therein were 1.58 parts by mass and 0.42 parts by mass, respectively, per 100 parts by mass of manganese dioxide.

EXAMPLE 4

A coin-shaped lithium primary battery (Battery A4) was prepared in substantially the same manner as that used to prepare Battery A1 except that, as an additive, 2 parts by mass of phthalimide was added to 100 parts by mass of a nonaqueous electrolyte.

EXAMPLE 5

A coin-shaped lithium primary battery (Battery A5) was prepared in substantially the same manner as that used to prepare Battery A2 except that, as an additive, 2 parts by mass of phthalimide was added to 100 parts by mass of a nonaqueous electrolyte.

EXAMPLE 6

A coin-shaped lithium primary battery (Battery A6) was prepared in substantially the same manner as that used to prepare Battery A3 except that, as an additive, 2 parts by mass of phthalimide was added to 100 parts by mass of a nonaqueous electrolyte.

EXAMPLE 7

A coin-shaped lithium primary battery (Battery A7) was prepared in substantially the same manner as that used to prepare Battery A3 except that a dispersion was prepared in such a manner that water and ethanol were added to acetylene black (the average size of primary particles being 35 nm) that was a carbon material, followed by sufficient mixing; the dispersion was applied to a single surface of a nonwoven fabric (a mass per unit area of 25 g/cm$^2$) which was a holding material, which had a thickness of 0.25 mm, and which was made of polypropylene (PP) by spraying; thereafter, a composite (carbon coat) of the carbon material (the amount of the carbon material held with the holding material (that is, the amount of the carbon material applied to a surface of a negative electrode) being 1.0 mg/cm$^2$) and the holding material was punched into a disk with a diameter of 15 mm, the composite being obtained by drying the nonwoven fabric at 60° C. for six hours; and the disk was attached to the surface of metallic lithium in the preparation of the negative electrode.

COMPARATIVE EXAMPLE 1

A coin-shaped lithium primary battery (Battery B1) was prepared in substantially the same manner as that used to prepare Battery A3 except that no distilled water was added in the mixing of a positive electrode (dry process) with reference to Patent Literature 1, which was a related technical literature relating to the present invention.

Incidentally, a surface of the positive electrode prepared in Comparative Example 1 was analyzed for the distribution of sulfur and ytterbium by energy dispersive X-ray spectroscopy. The detected intensity of sulfur in a portion in which ytterbium was detected was as weak as that in a peripheral portion thereof; hence, it was confirmed that a portion of ytterbium oxide was not present in the form of a sulfate in the case of a dry process.

COMPARATIVE EXAMPLE 2

A coin-shaped lithium primary battery (Battery B2) was prepared in substantially the same manner as that used to prepare Battery A1 except that no lanthanum oxide was used in the preparation of a positive electrode.

COMPARATIVE EXAMPLE 3

A coin-shaped lithium primary battery (Battery B3) was prepared in substantially the same manner as that used to prepare Battery A4 except that no lanthanum oxide was used in the preparation of a positive electrode.

COMPARATIVE EXAMPLE 4

A coin-shaped lithium primary battery (Battery B4) was prepared in substantially the same manner as that used to prepare Battery A1 except that lanthanum oxide was changed to boron oxide ($B_2O_3$) in the preparation of a positive electrode.

COMPARATIVE EXAMPLE 5

A coin-shaped lithium primary battery (Battery B5) was prepared in substantially the same manner as that used to prepare Battery A4 except that lanthanum oxide was changed to boron oxide ($B_2O_3$) in the preparation of a positive electrode.

The positive electrode mixes and batteries prepared in the above examples and comparative examples were evaluated as described below.

(Evaluation of Permeability of Nonaqueous Electrolyte through Positive Electrode)

The time taken for a nonaqueous electrolyte to completely permeate the inside of a positive electrode was measured in such a manner that 10 μL of the nonaqueous electrolyte was dripped onto the positive electrode. The fact that this time is short means that the permeability is excellent.

(OCV of Battery before and after Pre-discharge)

Twenty batteries identical to the battery prepared in each of the examples and the comparative examples were prepared. Ten of the 20 batteries were not pre-discharged (before pre-discharge) and the other ten batteries were discharged (pre-discharged) at a current of 30 mA such that the electrical capacity corresponded to 4% of the capacity of each positive electrode (after pre-discharge). The OCV of each battery was measured before and after pre-discharge. Among the ten batteries, the difference (variation in OCV) between the OCV of a battery that exhibited the maximum OCV and the OCV of a battery that exhibited the minimum OCV was determined. The fact that the variation in OCV is large means that the variation in internal state between batteries is large and the batteries are unstable.

When the variation in OCV is 0.02 V, the capacity varies by 0.18%. In order to restrict the variation in capacity between batteries as products to less than 0.25%, the following standard is used: a standard that pre-discharge is required when the variation in OCV is greater than 0.03 V. If the variation is 0.02 V or less, then pre-discharge need not be performed.

(Battery Capacity of Battery Before and After Pre-Discharge)

In the battery prepared in each of the examples and the comparative examples, 15 kΩ constant resistance discharge was performed at room temperature, whereby the capacity of the battery was measured.

The evaluation results of each the examples and the comparative examples are shown in Tables 1 to 3.

TABLE 1

| | Oxide | Parts by mass (per 100 parts by mass of MnO$_2$) | Sulfate | Parts by mass (per 100 parts by mass of MnO$_2$) | Electrolyte additive | Positive electrode mixing process | Permeation time (seconds) |
|---|---|---|---|---|---|---|---|
| A1 | La$_2$O$_3$ | 1.96 | La$_2$(SO$_4$)$_3$ | 0.04 | — | Wet | 39 |
| A2 | Y$_2$O$_3$ | 1.87 | Y$_2$(SO$_4$)$_3$ | 0.13 | — | Wet | 42 |
| A3 | Yb$_2$O$_3$ | 1.58 | Yb$_2$(SO$_4$)$_3$ | 0.42 | — | Wet | 43 |
| A4 | La$_2$O$_3$ | 1.96 | La$_2$(SO$_4$)$_3$ | 0.04 | Phthalimide | Wet | 31 |
| A5 | Y$_2$O$_3$ | 1.87 | Y$_2$(SO$_4$)$_3$ | 0.13 | Phthalimide | Wet | 38 |
| A6 | Yb$_2$O$_3$ | 1.58 | Yb$_2$(SO$_4$)$_3$ | 0.42 | Phthalimide | Wet | 35 |
| B1 | Yb$_2$O$_3$ | 2.00 | — | — | — | Dry | 46 |
| B2 | — | — | — | — | — | Wet | 46 |
| B3 | — | — | — | — | Phthalimide | Wet | 50 |
| B4 | B$_2$O$_3$ | 2.00 | — | — | — | Wet | 46 |
| B5 | B$_2$O$_3$ | 2.00 | — | — | Phthalimide | Wet | 46 |

As shown in Table 1, in Examples A1 to A6, in which a positive electrode active material, an oxide of a rare-earth element, and a sulfate thereof were present together, the permeability of a nonaqueous electrolyte was better than that in Comparative Example B1, in which only an oxide of a rare-earth element was present, and that in Comparative Example B2, in which no rare-earth element was present. It can be understood that the presence of both an oxide and sulfate of a rare-earth element in the vicinity of a positive electrode active material enhanced the permeability of a nonaqueous electrolyte.

On the other hand, in Comparative Examples B2 and B3, adding phthalimide to a nonaqueous electrolyte increased the permeation time of a positive electrode. This suggests that adding phthalimide to a nonaqueous electrolyte reduces the permeability of the nonaqueous electrolyte through a usual positive electrode porous layer. In Comparative Examples B4 and B5, in the case of mixing boron oxide, used to improve the long-term durability of batteries, in a positive electrode, the permeability of a nonaqueous electrolyte due to phthalimide was the same. This suggests that adding phthalimide does not change the permeability of the nonaqueous electrolyte even in a state in which a positive electrode active material and boron oxide are present together.

TABLE 2

| | Oxide | Parts by mass (per 100 parts by mass of MnO$_2$) | Sulfate | Parts by mass (per 100 parts by mass of MnO$_2$) | Electrolyte additive | Positive electrode mixing process | Carbon coat on negative electrode surface | Variation in OCV [V] Before pre-discharge | After pre-discharge |
|---|---|---|---|---|---|---|---|---|---|
| A1 | La$_2$O$_3$ | 1.96 | La$_2$(SO$_4$)$_3$ | 0.04 | — | Wet | — | 0.02 | <0.01 |
| A2 | Y$_2$O$_3$ | 1.87 | Y$_2$(SO$_4$)$_3$ | 0.13 | — | Wet | — | 0.02 | <0.01 |
| A3 | Yb$_2$O$_3$ | 1.58 | Yb$_2$(SO$_4$)$_3$ | 0.42 | — | Wet | — | 0.02 | <0.01 |
| A4 | La$_2$O$_3$ | 1.96 | La$_2$(SO$_4$)$_3$ | 0.04 | Phthalimide | Wet | — | 0.01 | <0.01 |
| A5 | Y$_2$O$_3$ | 1.87 | Y$_2$(SO$_4$)$_3$ | 0.13 | Phthalimide | Wet | — | 0.01 | <0.01 |
| A6 | Yb$_2$O$_3$ | 1.58 | Yb$_2$(SO$_4$)$_3$ | 0.42 | Phthalimide | Wet | — | 0.01 | <0.01 |
| A7 | Yb$_2$O$_3$ | 1.58 | Yb$_2$(SO$_4$)$_3$ | 0.42 | Phthalimide | Wet | Formed | <0.001 | <0.01 |
| B1 | Yb$_2$O$_3$ | 2.00 | — | — | — | Dry | — | 0.04 | <0.01 |
| B2 | — | — | — | — | — | Wet | — | 0.06 | 0.01 |
| B3 | — | — | — | — | Phthalimide | Wet | — | 0.05 | <0.01 |
| B4 | B$_2$O$_3$ | 2.00 | — | — | — | Wet | — | 0.07 | 0.01 |
| B5 | B$_2$O$_3$ | 2.00 | — | — | Phthalimide | Wet | — | 0.06 | <0.01 |

As shown in Table 2, in Examples A1 to A6, very little variation in OCV before pre-discharge was observed. In particular, adding phthalimide to a nonaqueous electrolyte further reduced the variation in OCV. This means that the pre-discharge of an assembled battery can be omitted. Incidentally, the upper limit of the variation in OCV that is an indicator of variation is estimated to be about 0.02 V.

On the other hand, in Comparative Examples B1 to B5, the variation in OCV was observed in the batteries before pre-discharge and was greater than 0.03 V.

As shown in Table 2, in Example A7, the variation in OCV before pre-discharge decreased and become better. This is because attaching a powdery carbon material and a fibrous carbon material to a portion of a surface of a negative electrode that faces a positive electrode allows the distribution of a nonaqueous electrolyte in the battery to be dispersed between the positive electrode and the negative electrode and allows the permeability of a liquid through the positive electrode to be uniform. This suggests that the stabilization of the supply of the nonaqueous electrolyte to the positive electrode in addition to a state in which a positive electrode active material, a rare-earth element oxide, and a sulfate were present together enhanced the permeability of the nonaqueous electrolyte and further stabilized the variation in OCV.

TABLE 3

| | Oxide | Parts by mass (per 100 parts by mass of $MnO_2$) | Sulfate | Parts by mass (per 100 parts by mass of $MnO_2$) | Electrolyte additive | Discharge capacity [mAh] | |
|---|---|---|---|---|---|---|---|
| | | | | | | Before pre-discharge | After pre-discharge |
| A1 | $La_2O_3$ | 1.96 | $La_2(SO_4)_3$ | 0.04 | — | 210 | 202 |
| A2 | $Y_2O_3$ | 1.87 | $Y_2(SO_4)_3$ | 0.13 | — | 210 | 202 |
| A3 | $Yb_2O_3$ | 1.58 | $Yb_2(SO_4)_3$ | 0.42 | — | 209 | 201 |
| A4 | $La_2O_3$ | 1.96 | $La_2(SO_4)_3$ | 0.04 | Phthalimide | 211 | 203 |
| A5 | $Y_2O_3$ | 1.87 | $Y_2(SO_4)_3$ | 0.13 | Phthalimide | 212 | 204 |
| A6 | $Yb_2O_3$ | 1.58 | $Yb_2(SO_4)_3$ | 0.42 | Phthalimide | 211 | 203 |

As shown in Table 3, in Examples A1 to A6, it was confirmed that the battery capacity before pre-discharge increased by about 8 mAh as compared to that after pre-discharge. This suggests that the battery capacity can be substantially increased by omitting the pre-discharge of an assembled battery in association with the reduction in variation in OCV.

INDUSTRIAL APPLICABILITY

A lithium primary battery according to the present invention is suitable for applications in driving devices for a long period. The lithium primary battery according to the present invention can be applied to, for example, gas meters, water meters, and the like.

REFERENCE SIGNS LIST

1 Battery case (positive electrode terminal)
2 Sealing plate (negative electrode terminal)
3 Gasket
4 Positive electrode
5 Negative electrode
6 Separator
10 Lithium primary battery
21 Positive electrode
22 Negative electrode
23 Separator
24 Electrode group
25 Positive electrode lead
26 Negative electrode lead
27 Positive electrode current collector
27a Positive electrode current collector exposed portion
28 Upper insulating plate
29 Lower insulating plate
30 Battery case
31 Sealing plate

The invention claimed is:

1. A lithium primary battery comprising a positive electrode, a negative electrode containing lithium, and a nonaqueous electrolyte solution having lithium ion conductivity,
wherein the nonaqueous electrolyte solution contains a nonaqueous solvent and a solute, and
the positive electrode contains a positive electrode active material containing at least manganese dioxide, a conductive agent, and a binding agent and further contains rare-earth element oxide particles and rare-earth element sulfate particles,
wherein the total amount of the rare-earth element oxide and the rare-earth element sulfate is 0.1 parts by mass to 5 parts by mass per 100 parts by mass of the manganese dioxide; and
wherein the total amount of the rare-earth element oxide particles is greater than the total amount of the rare earth element sulfate particles.

2. The lithium primary battery according to claim 1, wherein at least one of the rare-earth element oxide particles or the rare-earth element sulfate particles is in contact with the manganese dioxide.

3. The lithium primary battery according to claim 1, wherein the rare-earth element oxide particles are at least one selected from the group consisting of yttrium oxide, lanthanum oxide, ytterbium oxide, and the rare-earth element sulfate particles are at least one selected from the group consisting of yttrium sulfate, lanthanum sulfate, and ytterbium sulfate.

4. The lithium primary battery according to claim 1, wherein the manganese dioxide is electrolytic manganese dioxide.

5. The lithium primary battery according to claim 1, wherein the positive electrode contains 0.05 parts by mass to 2 parts by mass of sulfur from the rare-earth element sulfate particles per 100 parts by mass of the manganese dioxide.

6. The lithium primary battery according to claim 1, wherein the nonaqueous electrolyte solution further comprises an additive comprising phthalimide.

7. The lithium primary battery according to claim 1, wherein at least one portion of a surface of the negative electrode that faces the positive electrode has a powdery or fibrous carbon material attached thereto.

* * * * *